United States Patent
Wenderoth et al.

(10) Patent No.: US 6,802,988 B1
(45) Date of Patent: Oct. 12, 2004

(54) ANTIFREEZE CONCENTRATES BASED ON DICARBOXYLIC ACIDS, MOLYBDATE AND TRIAZOLES OR THIAZOLES, AND COOLANT COMPOSITIONS COMPRISING THEM

(75) Inventors: Bernd Wenderoth, Birkenau (DE); Ralf Strauss, Ludwigshafen (DE); Jacques Lonchampt, Montbeliard (FR)

(73) Assignee: BASF Aktiengesellschaft, Ludwigshafen (DE)

( * ) Notice: Subject to any disclaimer, the term of this patent is extended or adjusted under 35 U.S.C. 154(b) by 181 days.

(21) Appl. No.: 10/110,205

(22) PCT Filed: Oct. 20, 2000

(86) PCT No.: PCT/EP00/10335

§ 371 (c)(1),
(2), (4) Date: Apr. 17, 2002

(87) PCT Pub. No.: WO01/32801

PCT Pub. Date: May 10, 2001

(30) Foreign Application Priority Data

Oct. 29, 1999 (DE) .......................................... 199 52 482
Nov. 18, 1999 (DE) .......................................... 199 55 704

(51) Int. Cl.$^7$ ............................................. C09K 5/00
(52) U.S. Cl. ............................ 252/73; 252/76; 252/79; 252/82; 252/147.18; 252/180; 252/396
(58) Field of Search ............................... 252/73, 76, 79, 252/82, 147.18, 180, 396

(56) References Cited

U.S. PATENT DOCUMENTS

| 4,448,702 A | * | 5/1984 | Kaes ............................ 252/70 |
| 4,561,990 A | * | 12/1985 | Darden ........................ 252/76 |
| 4,578,205 A | * | 3/1986 | Yeakey et al. ................ 252/76 |
| 5,422,026 A | | 6/1995 | Greaney |

FOREIGN PATENT DOCUMENTS

| DE | 195 47 499 | 5/1997 |
| DE | 196 05 509 | 8/1997 |
| EP | 0 369 100 | 5/1990 |
| EP | 0 552 988 | 7/1993 |
| EP | 0 739 965 | 10/1996 |
| EP | 0 739 966 | 10/1996 |
| FR | 2 733 511 | 10/1996 |
| GB | 2 138 837 | 10/1984 |

* cited by examiner

Primary Examiner—Charles Boyer
Assistant Examiner—D. G. Hamlin
(74) Attorney, Agent, or Firm—Oblon, Spivak, McClelland, Maier & Neustadt, P.C.

(57) ABSTRACT

Antifreeze concentrates are based on a mixture of at least two different $C_3$- to $C_{16}$-dicarboxylic acids, molybdate and a mixture of at least two different triazoles or thiazoles.

18 Claims, No Drawings

ANTIFREEZE CONCENTRATES BASED ON DICARBOXYLIC ACIDS, MOLYBDATE AND TRIAZOLES OR THIAZOLES, AND COOLANT COMPOSITIONS COMPRISING THEM

The present invention relates to novel antifreeze concentrates based on a mixture of at least two different dicarboxylic acids, molybdate and a mixture of at least two different triazoles or thiazoles. Furthermore, the present invention relates to ready-to-use aqueous coolant compositions which comprise said antifreeze concentrates.

Radiator protection compositions for the coolant circulations of internal combustion engines, for example in automobiles, generally contain alkylene glycols, especially ethylene glycol or propylene glycol, as the main component. For use in the cooling system, they are diluted with water and, in addition to protection from freezing, should also ensure good heat removal. Alkylene glycol/water mixtures are however very corrosive at the operating temperatures of internal combustion engines, and it is for this reason that the various metals, for example copper, brass, iron, steel, cast iron (gray cast iron), lead, tin, chromium, zinc, aluminum, magnesium and the alloys thereof, and solder metals, such as tin solder (soft solder), which may occur in the cooling system, have to be adequately protected from the various types of corrosion, for example pitting, crevice corrosion, erosion or cavitation. The prior art has disclosed a large number of individual chemical substances for use as corrosion inhibitors in such cooling systems.

Antifreezes based on ethylene glycol and containing carboxylic acids, alkali metal molybdate and triazoles or thiazoles are disclosed in EP-B 552 988 (1), DE-A 34 13 416 (2), U.S. Pat. No. 4,561,990 (3) and DE-A 195 47 499 (4).

The operating conditions in modern internal combustion engines mean that today the corrosion protection capability and in particular the high-temperature stability of the coolant have to meet very much higher requirements than in the past with regard to thermal stress on the heat transfer surfaces, pressure and flow rate as well as the choice of a material. The known prior art compositions are unsatisfactory in this respect.

It is an object of the present invention to provide appropriate antifreeze concentrates which do not have the disadvantages of the prior art.

We have found that this object is achieved by antifreeze concentrates based on alkylene glycols or derivatives thereof, which contain (a) from 0.05 to 10, preferably from 0.1 to 5, % by weight, based on the total amount of the concentrate, of a mixture of at least two different dicarboxylic acids, each of 3 to 16 carbon atoms, in the form of their alkali metal, ammonium or substituted ammonium salts, (b) from 0.01 to 5, preferably from 0.05 to 2, % by weight, based on the total amount of the concentrate, of one or more alkali metal, ammonium or substituted ammonium molybdates and (c) from 0.01 to 3, preferably from 0.05 to 1, % by weight, based on the total amount of the concentrate, of a mixture of at least two different corrosion inhibitors selected from the group consisting of the hydrocarbon-triazoles and the hydrocarbon-thiazoles.

The novel antifreeze concentrates can be used wherever the protection of water-containing systems from freezing (as a rule for the range from 0 to −40° C., in particular from −20 to −35° C.) and simultaneously the corrosion protection of the metal housings of water-containing containers are to be ensured. The cooling circulations of internal combustion engines, in particular in automobiles, such as cars and trucks, are of particular interest here. However, the novel antifreeze concentrates can also be used for said purpose in stationary engines, in hot water circulations of central heating systems, in radiators heated by electrical resistors and in solar heating circulations.

In a preferred embodiment, the component (a) is a mixture of two different saturated aliphatic dicarboxylic acids, each of 3 to 16, preferably each of 4 to 12, carbon atoms.

Typical examples of such dicarboxylic acids are malonic acid, succinic acid, glutaric acid, adipic acid, pimelic acid, suberic acid, azelaic acid, sebacic acid, undecanedioic acid, dodecanedioic acid, dicyclopentadienedicarboxylic acid, phthalic acid and terephthalic acid. Corresponding imides, e.g. succinimide, may be also be used here.

A mixture of succinic acid and sebacic acid is particularly preferred for the component (a).

In a further preferred embodiment, the component (c) is a mixture of two different hydrocarbon-triazoles, in particular of benzotriazole and toluotriazole. However, a mixture of two hydrocarbon-thiazoles or of one hydrocarbon-triazole and one hydrocarbon-thiazole may also be used. Examples of suitable hydrocarbon-thiazoles are benzothiazole and 2-mercaptobenzothiazole.

In a further embodiment, the novel antifreeze concentrates additionally contain (d) from 0.05 to 5, preferably from 0.1 to 3, % by weight, based on the total amount of the concentrate, of one or more aliphatic or aromatic monocarboxylic acids, each of 5 to 18 carbon atoms, in the form of their alkali metal, ammonium or substituted ammonium salts.

Examples of suitable such linear or branched aliphatic monocarboxylic acids are pentanoic acid, hexanoic acid, octanoic acid, 2-ethylhexanoic acid, nonanoic acid, decanoic acid, undecanoic acid, dodecanoic acid and linolenic acid.

Suitable such aromatic monocarboxylic acids are in particular benzoic acid, as well as, for example, $C_1$–$C_8$-alkylbenzoic acids, such as o-, m- or p-methylbenzbic acid or p-tert-butylbenzoic acid, and hydroxyl-containing aromatic monocarboxylic acids, such as o-, m- or p-hydroxybenzoic acid or o-, m- or p-(hydroxymethyl)benzoic acid.

Aromatic monocarboxylic acids of 6 to 10 carbon atoms which may contain hydroxyl groups are particularly preferred as component (d).

All stated carboxylic acids are present as alkali metal salts, especially as sodium or potassium salts, as ammonium salts or as substituted ammonium salts (amine salts), for example trialkylamines or trialkanolamines.

Furthermore, the novel antifreeze concentrates may additionally contain one or more corrosion inhibitors selected from the group consisting of the alkali metal borates, alkali metal phosphates, alkali metal chromates, alkali metal silicates, alkali metal nitrites, alkali metal nitrates and magnesium nitrate in amounts of, in each case, up to 1, in particular from 0.01 to 0.8, % by weight, based on the total amount of the concentrate.

Examples of such additional corrosion inhibitors are sodium tetraborate (borax), disodium hydrogen phosphate, trisodium phosphate, sodium metasilicate, sodium nitrite and sodium nitrate.

When alkali metal silicates are present, they are expediently stabilized by conventional organosilicosulfonates in conventional amounts.

In addition to said inhibitor components, for example, soluble magnesium salts of organic acids, e.g. magnesium benzenesulfonate, magnesium methanesulfonate, magnesium acetate or magnesium propionate, hydrocarbazoles or quaternized imidazoles, as described in DE-A 196 05 509, may also be used in conventional amounts as further inhibitors.

Furthermore, the novel antifreeze concentrates may additionally contain up to 1, in particular from 0.01 to 0.5, % by weight, based on the total amount of the concentrate, of hard water stabilizers based on polyacrylic acid, polymaleic acid, acrylic acid/maleic acid copolymers, polyvinylpyrrolidone, polyvinylimidazole, vinylpyrrolidone/vinylimidazole copolymers and/or copolymers of unsaturated carboxylic acids and olefins.

However, low molecular weight compounds, for example polycarboxylic acids, such as 2-phosphonobutane-1,2,4-tricarboxylic acid, may also be used as hard water stabilizers or sequestering agents.

The pH of the novel antifreeze concentrates is usually from 6 to 11, preferably from 7 to 10, in particular from 7.5 to 9, especially from 7.5 to 8.3. The desired pH is as a rule established by adding alkali metal hydroxide, ammonia or amines to the formulation; solid sodium hydroxide or potassium hydroxide and aqueous sodium hydroxide or potassium hydroxide solution are particularly suitable for this purpose. Carboxylic acids which are to be present are expediently added directly as corresponding alkali metal salts in order automatically to be in the desired pH range; however, the carboxylic acids may also be added as free acids and then neutralized with alkali metal hydroxide, ammonia or amines, and the desired pH established.

Dicarboxylic acids used are preferably (completely or predominantly) present as dipotassium salts in the novel antifreeze concentrates, which results in an optimum alkalinity reserve of the formulation. Either the relevant acids are added directly as dipotassium salts or the free dicarboxylic acids in the formulation are neutralized with potassium hydroxide. When a mixture of succinic acid and sebacic acid is used, both may be present as dipotassium salts or the succinic acid as the dipotassium salt and the sebacic acid as the disodium salt. Depending on the dicarboxylic acid and pH used, minor amounts of the respective acidic monoalkali metal-hydrogen salts may also be present, in particular when sodium hydroxide is used as the neutralizing agent.

Suitable liquid alcoholic freezing point depressants, which usually account for the main part (as a rule at least 75, particularly at least 85, % by weight) of the novel antifreeze concentrates, are alkylene glycols and derivatives thereof, in particular propylene glycol and especially ethylene glycol. However, higher glycols and glycol ethers are also suitable, e.g. diethylene glycol, dipropylene glycol and monoethers of glycols such as the methyl, ethyl, propyl and butyl ether of ethylene glycol, propylene glycol, diethylene glycol and dipropylene glycol. Mixtures of said glycols and glycol ethers may also be used.

In a preferred embodiment, the novel antifreeze concentrates are based on ethylene glycol or mixtures of alkylene glycols which contain at least 95% by weight of ethylene glycol.

As further conventional assistants, the novel antifreeze concentrates may also contain, in conventional small amounts, antifoams (as a rule in amounts from 0.003 to 0.008% by weight), dyes and bitter substances for reasons of hygiene and of safety in the event of swallowing (for example of the denatonium benzoate) type.

The preparation of the novel antifreeze concentrates can be effected by mixing together said components in principle in any desired sequence. In a typical method of preparation the neutralizing agent, in particular sodium hydroxide or potassium hydroxide, is first dissolved in a part, for example half, the total amount of alkylene glycol. Thereafter, the two dicarboxylic acids are added in free form, for example first succinic acid and then sebacic acid. After these have dissolved to form a clear solution without residue, the remaining alkylene glycol is added. The remaining components are incorporated into the formulation either at the end or together with the dicarboxylic acids.

Particularly preferred novel antifreeze concentrates have the following composition:

from 0.5 to 3, in particular from 1.5 to 2, % by weight of succinic acid from 0.5 to 3, in particular from 1.5 to 2, % by weight of sebacic acid from 0.05 to 1, in particular from 0.1 to 0.5, % by weight of sodium molybdate or potassium molybdate from 0.05 to 0.5, in particular from 0.05 to 0.25, % by weight of benzotriazole from 0.05 to 0.5, in particular from 0.05 to 0.25, % by weight of toluotriazole from 0.1 to 2, in particular from 0.2 to 1, % by weight of benzoic acid from 0 to 5, in particular from 0.1 to 2, % by weight of demineralized water corresponding amounts of sodium hydroxide or potassium hydroxide for bringing the pH to 7.5 to 9 as the remainder to 100% by weight, monoethylene glycol or a mixture of alkylene glycols containing at least 85% by weight of monoethylene glycol.

The present invention also relates to ready-to-use aqueous coolant compositions having a reduced freezing point, in particular for radiator protection in the automotive sector, which comprise water and from 10 to 90, in particular from 20 to 60, % by weight of the novel antifreeze concentrates.

The novel antifreeze concentrates are distinguished by effective corrosion inhibition of the metals and alloys listed at the outset. They are also readily compatible with further materials, such as rubbers, plastics, glue joints, fiber and rubber seals and similar materials which may occur in plants or internal combustion engines, and give good results in electrochemical corrosion tests.

In particular, however, the novel antifreeze concentrates are distinguished by improved high-temperature stability to the prior art compositions. At temperatures of 160° C. or higher, the systems remain stable and give reproducible test results, for example at 175° C.

The examples which follow illustrate the invention without restricting it.

EXAMPLES

The radiator protection concentrate formulation A shown below in Table 1 was used as novel antifreeze concentrate and a formulation analogous to Example 1 of EP-B 552 988 (1) was used as comparative formulation B.

TABLE 1

Compositions of the antifreeze concentrates
[% by weight]

|  | Formulation A | Formulation B |
|---|---|---|
| Monoethylene glycol | 91.80 | 93.96 |
| Water | 0.75 | 0.47 |

TABLE 1-continued

Compositions of the antifreeze concentrates
[% by weight]

| | Formulation A | Formulation B |
|---|---|---|
| Succinic acid | 1.82 | — |
| Sebacic acid | 1.82 | 1.50 |
| Itaconic acid | — | 0.70 |
| Sodium molybdate dihydrate | 0.20 | 0.90 |
| Benzotriazole | 0.15 | — |
| Toluotriazole | 0.10 | 0.10 |
| Sodium benzoate | 0.40 | — |
| Potassium hydroxide | 2.96 | — |
| Sodium hydroxide (50% strength by weight) | — | 2.06 |
| Magnesium nitrate hexahydrate | — | 0.30 |
| Conventional hard water stabilizer (Bayhibit AM) | — | 0.01 |

Formulations A and B were subjected in aqueous dilution to a conventional corrosion test and a high-temperature stability test.

The results in the corrosion test according to ASTM D 1384 are shown in Table 2. They show that the novel formulation A has just as good a protective effect in the case of nonferrous metals, such as copper and brass, and the case of other metals, such as soft solder, steel, gray cast iron and cast aluminum, as the comparative formulation B and removal of material occurs in virtually no case.

TABLE 2

Glassware corrosion tests according to ASTM D 1384

| Test specimen | Formulation A Weight change [mg/cm²] | Formulation B Weight change [mg/cm²] |
|---|---|---|
| Copper | −0.01 | +0.01 |
| Soft solder | 0 | +0.02 |
| Brass | −0.01 | +0.01 |
| Steel | 0 | +0.02 |
| Gray cast iron | +0.06 | +0.09 |
| Cast aluminum | +0.06 | +0.04 |

In these corrosion tests, the concentration for each of the two formulations was 33% by volume in water.

In high-temperature stability tests for radiator protection compositions ("Tenue en Temperature d'un Liquide de Refroidissement") according to PSA standard D 55 5345 (comparable with Experimental Test Method CEC C-14-X-99 of Mar. 18, 1999), the effect of the temperature on the pH stability and on the pressure is determined. The sharper the increase in these two parameters, the greater the extent to which the corrosion inhibitors contained in the radiator protection formulation undergo decomposition.

For this purpose, 660 ml of the radiator protection concentrate formulation A or B diluted to 33% by volume in water were introduced into a closed aluminum pressure-resistant container in which a cast iron ring was also present as a second metal, and were left to stand at 175° C. for 192 hours while stirring. At specific time intervals, the pressure was measured, samples were taken and the pH of the samples was determined. After the end of the test an additional visual assessment was carried out to determine whether deposits or corrosion had occurred on the metal surfaces. 24 hours after completion of the test, the volume of the residue in the liquid was also determined.

The results of this high-temperature stability test are shown in Table 3. While the pH and the pressure remained virtually constant when the novel formulation A was used, both parameters increased substantially and a precipitate formed on the aluminum surface when the comparative formulation B was used, and at the same time a considerably greater residue was also found here in the test liquid.

TABLE 3

High-temperature stability test
according to PSA standard D 55 5345

| | Formulation A | | Formulation B | |
|---|---|---|---|---|
| Run time [h] | pH | Pressure [bar] | pH | Pressure [bar] |
| 0 | 7.90 | 7.0 | 8.03 | 6.8 |
| 8 | 7.64 | 7.0 | 6.85 | 6.8 |
| 24 | 7.59 | 7.1 | 6.92 | 6.9 |
| 48 | 7.57 | 7.2 | 8.66 | 7.0 |
| 72 | 7.58 | 7.2 | 9.52 | 7.2 |
| 144 | 7.96 | 7.4 | 10.32 | 8.0 |
| 192 | 8.20 | 7.5 | 10.40 | 9.5 |
| Visual assessment: | | | | |
| Aluminum | no deposit | | white deposit | |
| Cast iron | no deposit | | no deposit | |
| Volume of the residue | 3 ml | | 7 ml | |

These results show that the novel antifreeze concentrates have substantially improved high-temperature stability in combination with an equally good corrosion protection effect compared with the prior art.

What is claimed is:

1. An antifreeze concentrate comprising one or more alkylene glycols or one or more derivatives thereof, and
   (a) from 0.05 to 10% by weight, based on the total weight of the concentrate, of a mixture of at least two different dicarboxylic acids each having from 3 to 16 carbon atoms in the form of their alkali metal salts, ammonium salts, substituted ammonium salts, or, in the case of saturated aliphatic dicarboxylic acids having from 3 to 16 carbon atoms, their imides,
   (b) from 0.01 to 5% by weight, based on the total weight of the concentrate, of one or more alkali metal molybdates, ammonium molybdates or substituted ammonium molybdates, and
   (c) from 0.01 to 3% by weight, based on the total weight of the concentrate, of a mixture of at least two different corrosion inhibitors selected from the group consisting of hydrocarbon triazoles and hydrocarbon thiazoles.

2. The antifreeze concentrate as claimed in claim 1 in which the component (a) is a mixture of two different saturated aliphatic dicarboxylic acids each having from 3 to 16 carbon atoms.

3. The antifreeze concentrate as claimed in claim 1 in which the component (c) is a mixture of two different hydrocarbon triazoles.

4. The antifreeze concentrate as claimed in claim 1 which further comprises
   (d) from 0.05 to 5% by weight, based on the total weight of the concentrate, of one or more aliphatic or aromatic monocarboxylic acids each having from 5 to 18 carbon atoms in the form of their alkali metal salts, ammonium salts or substituted ammonium salts.

5. The antifreeze concentrate as claimed in claim 1 which further comprises one or more corrosion inhibitors selected from the group consisting of alkali metal borates, alkali metal phosphates, alkali metal silicates, alkali metal nitrites, alkali metal nitrates and magnesium nitrate, in amounts of in each case up to 1% by weight, based on the total weight of the concentrate.

6. The antifreeze concentrate as claimed in claim 1 which further comprises up to 1% by weight, based on the total weight of the concentrate, of one or more hard water stabilizers based on polyacrylic acid, polymaleic acid, acrylic acid-maleic acid copolymers, polyvinylpyrrolidone, polyvinylimidazole, vinylpyrrolidone-vinylimidazole copolymers, copolymers of unsaturated carboxylic acids, copolymers of olefins, or mixtures thereof.

7. The antifreeze concentrate as claimed in claim 1 having a pH in the range from 6 to 11.

8. The antifreeze concentrate as claimed in claim 1 comprising ethylene glycol or a mixture of alkylene glycols containing at least 95% by weight of ethylene glycol.

9. A ready-to-use aqueous coolant composition having a depressed freezing point which comprises water and from 10 to 90% by weight of the antifreeze concentrate as claimed in claim 1.

10. The antifreeze of claim 1, wherein the one or more alkylene glycols is an alkylene glycol derivative.

11. The antifreeze concentrate of claim 2, wherein the aliphatic dicarboxylic acids each have from 4 to 12 carbon atoms.

12. The antifreeze concentrate of claim 3, wherein component (c) is a mixture of benzotriazole and toluotriazole.

13. The antifreeze concentrate as claimed in claim 1, wherein the two different dicarboxylic acids are selected from the group consisting of malonic acid, succinic acid, glutaric acid, adipic acid, pimelic acid, suberic acid, azelaic acid, sebacic acid, undecanedioic acid, dodecanedioic acid, dicyclopentadienedicarboxylic acid, phthalic acid and terephthalic acid.

14. The antifreeze concentrate as claimed in claim 1, wherein the dicarboxylic acids are succinic acid and sebacic acid.

15. The antifreeze concentrate as claimed in claim 1, wherein the at least two different corrosion inhibitors are benzothiazole and 2-mercaptobenzothiazole.

16. The antifreeze concentrate as claimed in claim 1, wherein the dicarboxylic acids are present as dipotassium salts.

17. The composition as claimed in claim 1, comprising:
   from 0.5 to 3% by weight of succinic acid,
   from 0.5 to 3% by weight of sebacic acid,
   from 0.05 to 1% by weight of at least one of sodium molybdate or potassium molybdate,
   from 0.05 to 0.5% by weight of benzotriazole,
   from 0.05 to 0.5% by weight of toluotriazole,
   from 0.1 to 2% by weight and benzoic acid, and
   from 0 to 5% by weight of demineralized water.

18. The antifreeze concentrate as claimed in claim 1, comprising
   from 1.5 to 2% by weight of succinic acid,
   from 1.5 to 2% by weight of sebacic acid,
   from 0.1 to 0.5% by weight of at least one of sodium molybdate or potassium molybdate,
   from 0.05 to 0.25% by weight of benzotriazole,
   from 0.05 to 0.25% by weight of toluotriazole,
   from 0.2 to 1% by weight of benzoic acid, and
   from 0.1 to 2% by weight of demineralized water,
   wherein the one or more alkylene glycols comprises at least 85% by weight of monoethylene glycol.

* * * * *